US005117725A

United States Patent [19]

Takauji et al.

[11] Patent Number: 5,117,725

[45] Date of Patent: Jun. 2, 1992

[54] DEVICE FOR CHANGING AND CONTROLLING THE RATE OF GENERATING WAVEFORM DATA

[75] Inventors: Kiyomi Takauji; Yutaka Washiyama, both of Hamamatsu, Japan

[73] Assignee: Kawai Musical Inst. Mfg. Co. Ltd., Sizuoka, Japan

[21] Appl. No.: 492,986

[22] Filed: Mar. 13, 1990

[30] Foreign Application Priority Data

Mar. 15, 1989 [JP] Japan ................................ 1-62558

[51] Int. Cl.[5] ........................ G10H 7/12; G06F 1/02

[52] U.S. Cl. .................................... 84/605; 84/607; 364/723

[58] Field of Search ................ 84/604, 605, 606, 627, 84/607, 622, 623, 625, 603; 364/723, 419

[56] References Cited

U.S. PATENT DOCUMENTS

| | | | |
|---|---|---|---|
| 4,348,928 | 9/1982 | Sakashita et al. | 84/604 |
| 4,718,030 | 1/1988 | Tsutsumi | 364/723 |
| 4,809,577 | 3/1989 | Fujita | 84/604 |
| 4,936,179 | 6/1990 | Kitagawa | 84/604 |

*Primary Examiner*—Stanley J. Witkowski
*Assistant Examiner*—Helen Kim

[57] ABSTRACT

A device for changing and controlling the rate of generating waveform data wherein rate changing data such as phase angle step data corresponding to steps, wherein each pair of contiguous steps has an interval smaller than a preset interval, are necessary. The necessary rate changing data of interval other than the preset rate changing data is obtained by effecting an interpolation from the preset rate changing data. Accordingly, it becomes unnecessary to store the rate changing data obtained by performing the interpolation, and thus, the quantity of the phase angle step data SD to the stored can be greatly reduced.

16 Claims, 13 Drawing Sheets

$$NSDS = NSD + \{(N+1)SD - NSD\} \times CD$$

$$NSDS = NSD \times (1 - CD) + (N+1)SD \times CD$$

| NOTE NO. | FREQUENCY (Hz) F | PHASE ANGLE STEP DATA (FREQUENCYNO.) NSD | POWER P | MANTISSA 4096×M |
|---|---|---|---|---|
| ⋮ | ⋮ | ⋮ | ⋮ | ⋮ |
| 36 | 65.4064 | 0.5358094 | 7 | 2195 |
| 37 | 69.2957 | 0.5676701 | 7 | 2326 |
| 38 | 73.4162 | 0.6014256 | 7 | 2464 |
| 39 | 77.7818 | 0.6371883 | 7 | 2610 |
| 40 | 82.4069 | 0.6750774 | 7 | 2766 |
| 41 | 87.3071 | 0.7152197 | 7 | 2930 |
| 42 | 92.4986 | 0.7577488 | 7 | 3104 |
| 43 | 97.9989 | 0.8028069 | 7 | 3289 |
| 44 | 103.8262 | 0.8505444 | 7 | 3484 |
| 45 | 110.0000 | 0.90112 | 7 | 3691 |
| 46 | 116.5410 | 0.9547036 | 7 | 3911 |
| 47 | 123.4709 | 1.011473 | 8 | 2072 |
| 48 | 130.8128 | 1.071619 | 8 | 2195 |
| 49 | 138.5913 | 1.13534 | 8 | 2326 |
| 50 | 146.8324 | 1.202851 | 8 | 2464 |
| 51 | 155.5635 | 1.274376 | 8 | 2610 |
| 52 | 164.8138 | 1.350155 | 8 | 2766 |
| 53 | 174.6141 | 1.430439 | 8 | 2930 |
| 54 | 184.9972 | 1.515497 | 8 | 3104 |
| 55 | 195.9978 | 1.605614 | 8 | 3289 |
| 56 | 207.6524 | 1.701088 | 8 | 3484 |
| 57 | 220.0000 | 1.80224 | 8 | 3691 |
| 58 | 233.0819 | 1.909407 | 8 | 3911 |
| 59 | 246.9417 | 2.022946 | 9 | 2072 |
| 60 | 261.6256 | 2.143237 | 9 | 2195 |
| ⋮ | ⋮ | ⋮ | ⋮ | ⋮ |

FIG. 11

NUMBER OF STEPS FOR PERIOD NSP = 512
SAMPLING CLOCK FREQUENCY SCF = 62.5KHZ
PHASEANGLE STEP DATA NSD = F × NSP ÷ SCF $$= M \times 2^{P-7} \quad (0.5 \leq M < 1)$$

FIG. 12

| CENT DATA CD | CENT DATA 16 STEPS | CENT | COMPENSATED & INTERPOLATED PHASE ANGLE STEP DATA (RATIO) | INTERPOLATED PHASE ANGLE STEP DATA (RATIO) | CENT ERROR | COMPENSATED DATA | COMPENSATED INTERPOLATED DATA |
|---|---|---|---|---|---|---|---|
| 0 | 0/16 | 0.00 | 1.00000000 | 1.00000000 | 0.0000 | 1.000000 | 0.000000 |
| 1 | 1/16 | 6.25 | 1.00361667 | 1.00371644 | 0.1721 | 0.999900 | 0.062494 |
| 2 | 2/16 | 12.50 | 1.00724641 | 1.00743288 | 0.3205 | 0.999815 | 0.124977 |
| 3 | 3/16 | 18.75 | 1.01088929 | 1.01114932 | 0.4453 | 0.999743 | 0.187452 |
| 4 | 4/16 | 25.00 | 1.01454534 | 1.01486577 | 0.5467 | 0.999684 | 0.249921 |
| 5 | 5/16 | 31.25 | 1.01821461 | 1.01858221 | 0.6249 | 0.999639 | 0.312387 |
| 6 | 6/16 | 37.50 | 1.02189715 | 1.02229865 | 0.6801 | 0.999607 | 0.474853 |
| 7 | 7/16 | 43.75 | 1.02559301 | 1.02601510 | 0.7124 | 0.999589 | 0.437320 |
| 8 | 8/16 | 50.00 | 1.02930224 | 1.02973154 | 0.7219 | 0.999583 | 0.499792 |
| 9 | 9/16 | 56.25 | 1.03302488 | 1.03344798 | 0.7089 | 0.999591 | 0.562270 |
| 10 | 10/16 | 62.50 | 1.03676099 | 1.03716443 | 0.6736 | 0.999611 | 0.624757 |
| 11 | 11/16 | 68.75 | 1.04051060 | 1.04088087 | 0.6160 | 0.999644 | 0.687255 |
| 12 | 12/16 | 75.00 | 1.04427378 | 1.04459731 | 0.5363 | 0.999690 | 0.749768 |
| 13 | 13/16 | 81.25 | 1.04805057 | 1.04831376 | 0.4347 | 0.999749 | 0.812296 |
| 14 | 14/16 | 87.50 | 1.05184102 | 1.05203020 | 0.3113 | 0.999820 | 0.874827 |
| 15 | 15/16 | 93.75 | 1.05564518 | 1.05574664 | 0.1664 | 0.999904 | 0.937410 |
| 16 | 16/16 (0/16) | 100 | 1.05946309 | 1.05946309 | 0.0000 | 1.000000 | 0.000000 |

DEVICE FOR CHANGING AND CONTROLLING THE RATE OF GENERATING WAVEFORM DATA

BACKGROUND OF THE INVENTION

1. Field of the Invention

This invention relates to a device for changing and controlling the rate of generating waveform data.

2. Description of the Related Art

In a conventional electronic musical instrument, in the case of, for example, musical tone waveform data, the waveform data of one wavelength or half wavelength is prestored in a waveform data memory, and when reading the waveform data therefrom, a musical tone having an indicated pitch is realized by changing the rate at which the waveform data is read. Further, when reading the waveform data, data (namely, frequency number data or phase angle step data) corresponding to the indicated pitch is sequentially accumulated at a constant period, and the result of the accumulation is supplied to the waveform data memory as reading address data. In this case, the rate of reading the waveform data can be changed by varying the phase angle step data in accordance with the indicated pitch.

FIGS. 13 to 15 show a conventional device for changing and controlling the rate of generating waveform data, wherein switches of a key switch matrix portion 92 which are in a key on or key off state (i.e., are turned on or off) are scanned and detected by a key assigner portion 91, a control operation for assigning channels to the detected switches is carried out, and key information I corresponding to the switches which are turned on (hereunder sometimes referred to as the key on switches) is supplied to a phase angle step data storing memory 93. The phase angle step data SD corresponding to pitches of the key codes are read out of the phase angle step data storing memory 93 and accumulated by an accumulator 94 upon receiving a clock signal Ac having a constant period to obtain accumulated data. Data represented by high-order bits of this accumulated data is supplied to a waveform data storing memory 95, and the musical tone waveform data WD is serially read from the waveform data storing memory 95 at a rate corresponding to the phase angle step data SD and is multiplied by envelope data ED by a multiplier 96. The results of the multiplication are supplied through a digital-to-analog (D/A) converter 97 to a sound radiating system 98 from which the musical tone is radiated. Furthermore, key information II indicating the time of a key on and key off is supplied from the key assigner portion 91 to an envelope generator 99, whereupon a part corresponding to an attack time of envelope data ED (hereunder sometimes referred to as attack data), a part corresponding to a decay time thereof (hereunder sometimes referred to as decay data), a part corresponding to a sustain time thereof (hereunder sometimes referred to as sustain data) and a part of a release time thereof (hereunder sometimes referred to as release data) are generated. Thereafter, the attack, decay, sustain, and release data are supplied to the multiplier 96.

FIGS. 14 and 15 show modifications of a part of the conventional device of FIG. 13. In these modifications, the phase angle step data SD of one octave is prestored in the phase angle step data storing memory 93, and further, the phase angle step data SD is read therefrom by using note data of the key code as reading addresses. The thus read phase angle step data SD is then shifted by a shift circuit 90 in accordance with octave data of the key code, to generate phase angle step data SDa of other octaves. Further, in the circuit of FIG. 14, the phase angle step data SD is accumulated by the accumulator 94 after being shifted in accordance with the octave data. In contrast, in the circuit of FIG. 15, after the phase angle step data SD is accumulated by the accumulator 94, the accumulated phase angle step data SDA is shifted in accordance with the octave data.

Where, however, phase angle step data corresponding to steps, wherein each pair of contiguous steps has an interval smaller than the preset interval, becomes necessary, the quantity of the phase angle step data SD to be stored in the phase angle step data storing memory 93 becomes huge. For example, where the phase angle step data is provided for every cent of 8 octaves, the number of necessary phase angle step data is 9600 ($=100\times 12\times 8$) because one octave has 12 semitones, and further, a semitone corresponds to 100 cents. Even when the circuit of FIGS. 14 or 15 is employed, the number of necessary phase angle step data is 1200 ($=100\times 12$), and thus the quantity of the phase angle step data is still vast.

SUMMARY OF THE INVENTION

The present invention is intended to solve the above-described problem of the conventional device.

Therefore, an object of the present invention is to provide a device for changing the rate of reading waveform data, by which the quantity of phase angle step data SD to be stored can be greatly reduced.

To achieve the foregoing object, and in accordance with the present invention, there is provided a device for changing and controlling the rate of reading waveform data. When rate changing data such as phase angle step data corresponding to steps, wherein each pair of contiguous steps has an interval smaller than the preset interval, are necessary, necessary rate changing data other than the preset rate changing data is obtained by effecting an interpolation from the preset rate changing data.

Accordingly, it becomes unnecessary to store the rate changing data to be obtained by the interpolation, and thus the quantity of the phase angle step data SD to be stored can be greatly reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features, objects and advantages of the present invention will become apparent from the following description of a preferred embodiment with reference to the drawings which are given by way of illustration only and thus are not limitative of the present invention in which like reference characters designate like or corresponding parts throughout several views, and in which:

FIG. 11 is a diagram showing the values of the phase angle step data NSD;

FIG. 12 is a diagram showing the values of compensated and interpolated phase angle step data NSDS, compensation data, compensated and interpolated data, and so on corresponding to those of the cent data.

DESCRIPTION OF THE PREFERRED EMBODIMENTS

Hereinafter, a preferred embodiment of the present invention will be described in detail with reference to the accompanying drawings. Note, in the figures, each arrow is drawn by using a single line but may indicate data represented by a plurality of bits.

Figure 2:
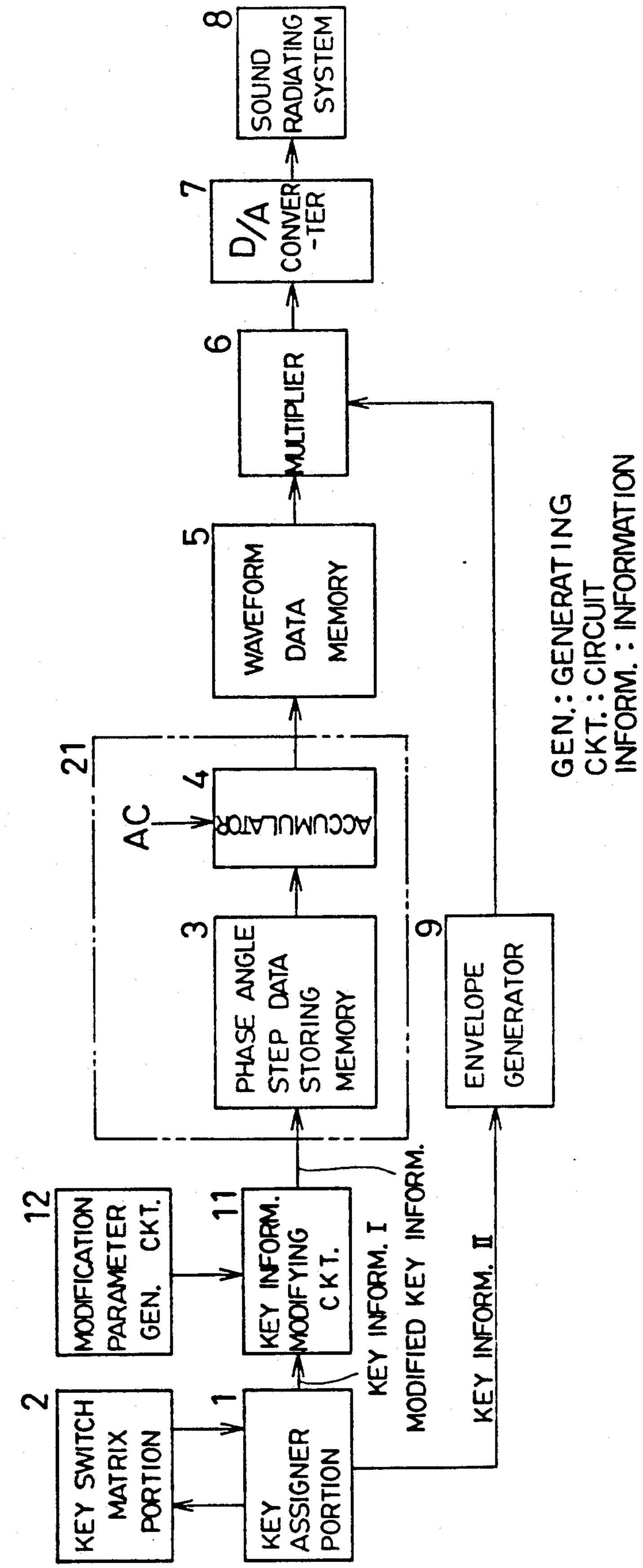
FIG. 2 is a schematic block diagram showing the overall construction of an electronic musical instrument provided with a device for changing the rate of reading waveform data and embodying the present invention.

FIG. 2 shows the overall construction of an electronic musical instrument provided with a device for changing the rate of generating waveform data. First, switches of a key switch matrix portion 2, which are in the key on or key off state, are scanned and detected by a key assigner portion 1. Then a control operation for assigning channels to the detected switches is carried out, and key information I corresponding to the key on switches is supplied to a key information modifying circuit 11, whereupon cent data CD, which is a parameter having a resolution represented in terms of cent, corresponding to a tuning control by a modification parameter generating circuit 12 is added to note number data N of a key code of the key information I. Note, the cent data CD and note number data N may be changed in response to the addition thereto of effects such as a vibrato and a glide.

Further, modified key information from the key information modifying circuit 11 is supplied to a phase angle step data storing memory 3 provided in a waveform data reading circuit 21, and phase angle step data SD corresponding to the pitch represented by the key code is read from the phase angle data storing memory 3 and accumulated by an accumulator 4 upon receiving a clock signal AC having a constant period. Thereafter, data represented by high-order bits of the data obtained by the accumulation is supplied to a waveform data storing memory 5. Subsequently, musical tone waveform data WD is sequentially read out of the waveform data storing memory 5 at a rate corresponding to a value indicated by the phase angle step data SD, and then multiplied by envelope data ED in a multiplier 6. The result of the multiplication is then sent through a digital-to-analog (D/A) converter 7 to a sound radiating system 8, from which corresponding musical sounds are radiated. On the other hand, key information II indicating the time at which the key on or key off state occurred is fed from the key assigner portion 1 to an envelope generator 9, and as a result, attack data, decay data, sustain data, and release data of the thus generated envelope data ED are generated, and the thus generated attack, decay, sustain, and release data are supplied to the multiplier 6.

Figure 3A:
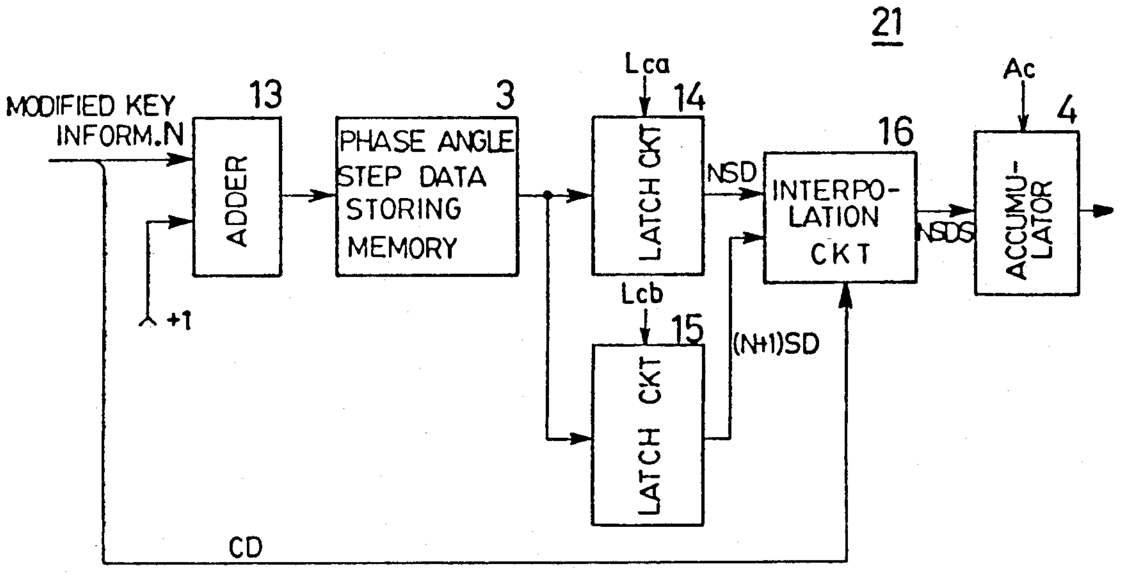
FIG. 3A is a circuit diagram of a device for changing the rate of reading waveform data of FIG. 2.
Figure 3B:
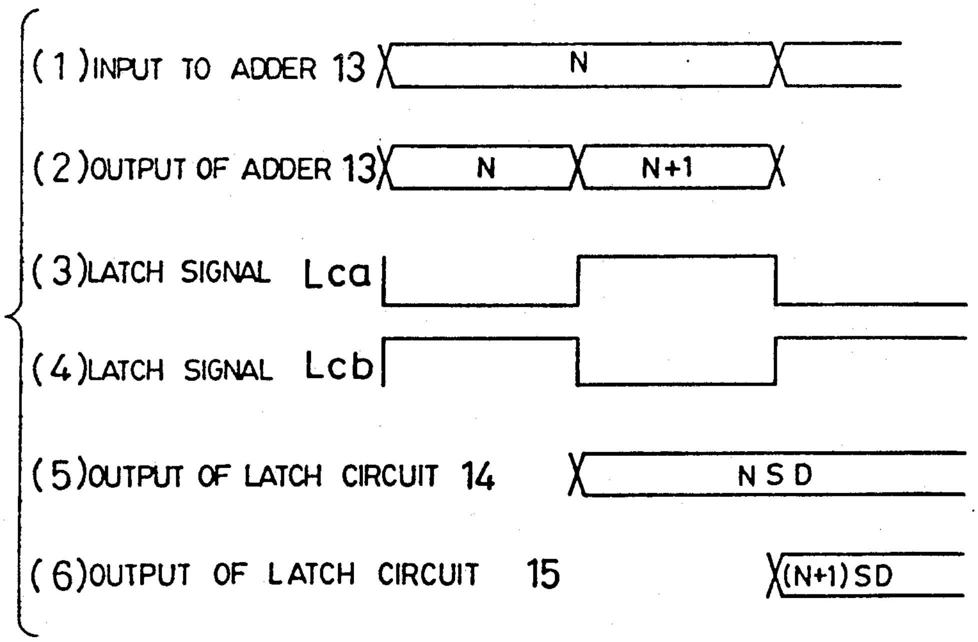
FIG. 3B is a timing chart of each of the signals shown in FIG. 3A.

The waveform data reading circuit 21 is not composed of only the phase angle step data storing memory 3 and the accumulator 4, but is practically constructed as shown in FIG. 3A. Namely, the note number data N included in the modified key information is supplied to the phase angle step data storing memory 3 through an adder 13 provided with a carry-in terminal Cin to which a clock signal having a period equal to a channel time is supplied. Further, the note number data N and N+1 are alternately output from the adder 13 in a time-sharing manner.

Figure 7:
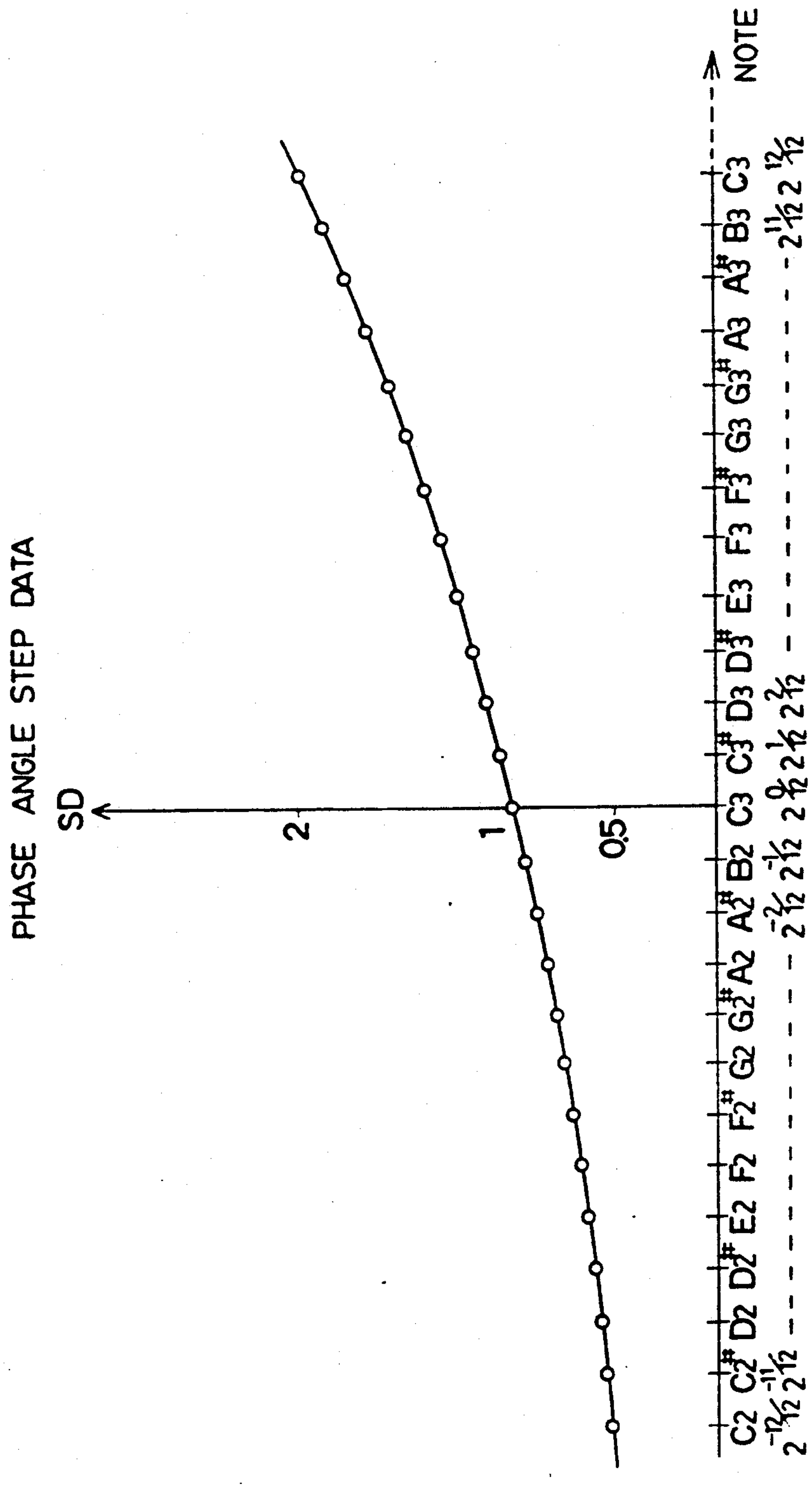
FIG. 7 is a graph showing the relationship between teh value of the phase angle step data SD corresponding to each pitch and note.

FIGS. 7 and 11 show the content of data stored in the phase angle step data storing memory 3. Further, the corresponding phase angle step datum SD is stored at each location in the memory 3 by using the note number data N as address data. FIG. 11 also shows the values of the corresponding practical frequencies.

Phase step angle data NSD read out of the phase angle step data storing memory 3 by using the note number datum N is latched by a latch circuit 14 at a time corresponding to a leading edge of a clock signal Lca. Similarly, phase step angle data (N+1)SD read out of the phase angle step data storing memory 3 by using the note number datum N+1, obtained by incrementing the note number datum N, is latched by another latch circuit 15 at a time corresponding to a leading edge of a clock signal Lcb.

Figure 1A:
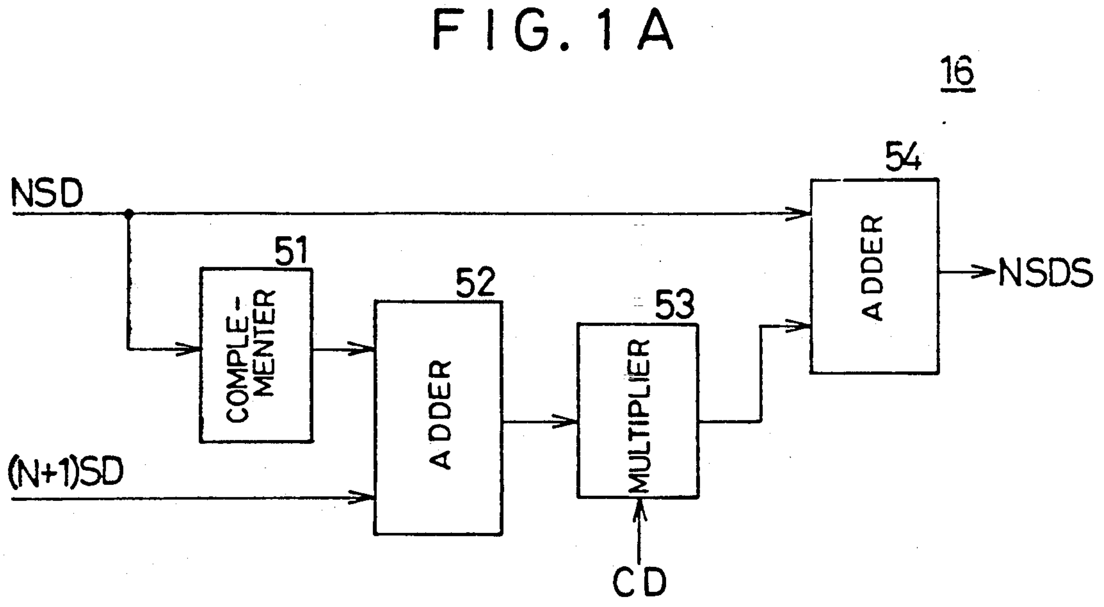
FIGS. 1A and 1B are circuit diagrams of interpolation circuits 16 provided in an embodiment of the present invention.
Figure 1B:
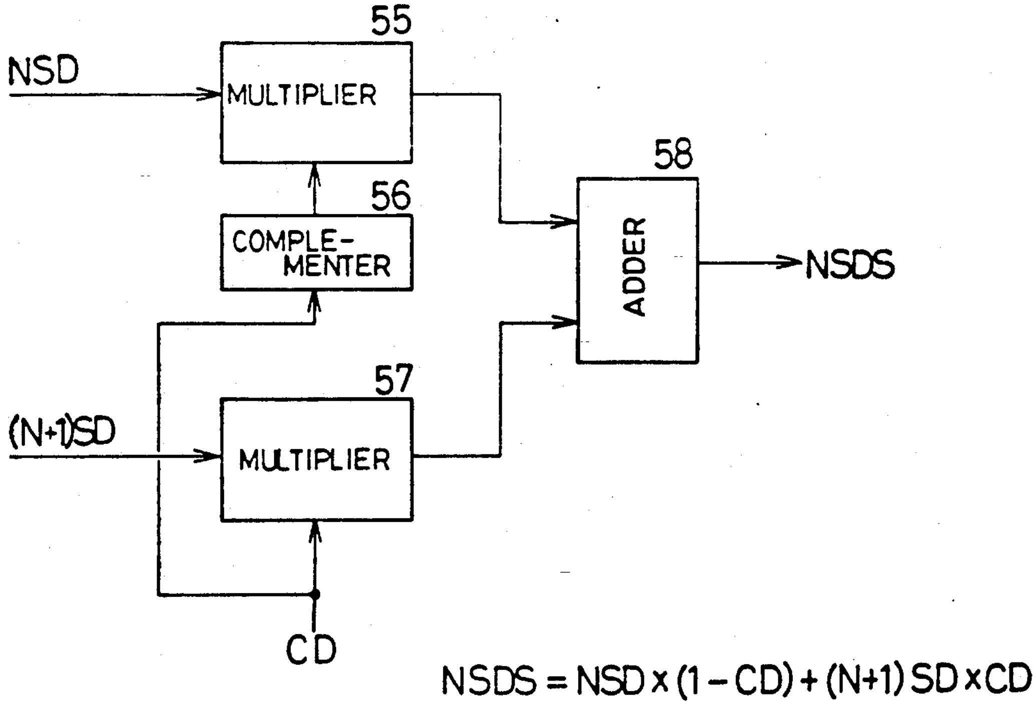

The phase angle step data NSD and (N+1)SD are then input to an interpolation circuit 16, whereupon an interpolation is performed based on the cent data CD included in the modified key information from the key information modifying circuit 11. This interpolation is effected, as described later, by obtaining a distance (hereunder referred to simply as a linear interpolation distance or a proportional interpolation distance), directly proportional to the difference between the phase angle step data NSD and (N+1)SD from the phase step data NSD, from an intermediate value (hereunder sometimes referred to as interpolated phase angle step data NSDS) by using the cent data CD as a proportionality factor. The interpolated phase angle step data NSDS is accumulated by the accumulator 4, and output to the waveform data memory 5 as reading address data. FIGS. 1A and 1B show two practical examples of the interpolation circuit 16, which perform different interpolation procedures but obtain the same results.

As seen from FIG. 1A, the phase angle step data NSD is inverted by a complementer 51 to a two's complement thereof, and the obtained complement is then added by an adder 52 to the phase angle step data (N+1)SD, which is one step ahead of the phase angle step data NSD. Accordingly, the difference {(N+1)SD−NSD} between the phase angle step data (N+1)SD and NSD is obtained by subtracting the phase angle step data NSD from the data (N+1)SD, and subsequently, this difference data {(N+1)SD−NSD} is multiplied by the cent data CD, by a multiplier 53, so that the linear interpolation distance {(N+1)SD−NSD}×CD is obtained. Thereafter, this interpolation distance is added to the phase angle step data NSD by an adder 54 to obtain the interpolated phase angle step data NSDS, and thus the interpolation is completed.

Note, the complementer 51 is composed of a group of inverters, wherein datum indicated by each bit of the phase angle step data NSD is inverted and the inverted data output therefrom to the adder 52, whereupon data represented by the inverted bits is incremented by +1 by supplying a signal having a high level to a Cin terminal thereof.

Further, as seen from FIG. 1B, in another example of the interpolation circuit, the phase angle step data NSD is multiplied by a two's complement of the cent data CD, by a multiplier 55, but the phase angle step data (N+1)SD is multiplied by the cent data CD by a multiplier 57. The multiplication data NSD×(1−CD) and (N+1)SD×CD are added by an adder 58, to obtain the interpolated phase angle step data NSDS, and thus the interpolation is completed. Furthermore, the two's complement of the cent data CD is obtained by inputting the cent data to the complementer 56, which is also composed of a group of inverters wherein datum indicated by each bit of the CD is inverted, and is then output therefrom. Moreover, data represented by the inverted bits is incremented by +1 by an adder (not shown) provided in the complementer 56.

Therefore, in the interpolation circuit 16 of FIG. 1B, the phase angle step data (N+1)SD, which is one step in advance of the data NSD, is weighted by being multiplied by the cent data CD (i.e., the weight CD is added to the data (N+1)SD), by the multiplier 57, but the phase angle step data NSD is weighted by being multiplied by the complement (1−CD) of the cent data CD (i.e., the weight (1−CD) is added to the data NSD) by the multiplier 55. Thereafter, by adding the weighted data to each other, the interpolated phase angle step data NSDS between the data NSD and (N+1)SD corresponding to the cent data CD is obtained. In this case, a linear interpolation method is used, as in the interpolation circuit of FIG. 1A, and thus exactly the same result is obtained even though the interpolation process is different from that used in the interpolation circuit of FIG. 1A.

Further, 1 in the expression NSD×(1−CD) is expressed in the binary form as 100 . . . 0; the number 0 thereof being equal to that of the number of bits used to represent the cent data. Where the number of bits used for the cent data is, for example, 4 (corresponding to 16 steps), the cent data from 0000 (=0) to 1111 (=15) is subtracted from 1.

FIG. 12 shows the content of the interpolation when 100 cents corresponding to a semitone is divided into 16 steps, and that the corresponding 16 interpolated phase angle step data NSDS between a value of the phase angle step data NSD and the value of the corresponding data (N+1)SD is obtained, by way of an example. Further, the ratio of the value of the interpolated phase angle step data NSDS to that of the phase angle step data NSD is given by the following expression, using the value of the cent data CD:

$$2^{0/1200}+(2^{100/1200}-2^{0/1200})\times(CD/16).$$

Obviously, the number of steps used in the interpolation (hereunder referred to simply as interpolation steps) is not limited to 16. Furthermore, in FIG. 12, the values of the interpolated phase angle step data NSDS are indicated in terms of the ratio of each of the value of the data NSDS to the value of the data NSD. The actual value of one of the data NSDS is obtained by multiplying the ratio of the value of the data NSDS to the data NSD shown in FIG. 12 by the corresponding value of the phase angle step data SD shown in the center column of FIG. 11.

By performing the interpolation in the above described manner, only the phase angle step data SD every semitone must be stored in the phase angle step data storing memory 3, and thus the quantity of data to be stored is reduced.

Figure 8:
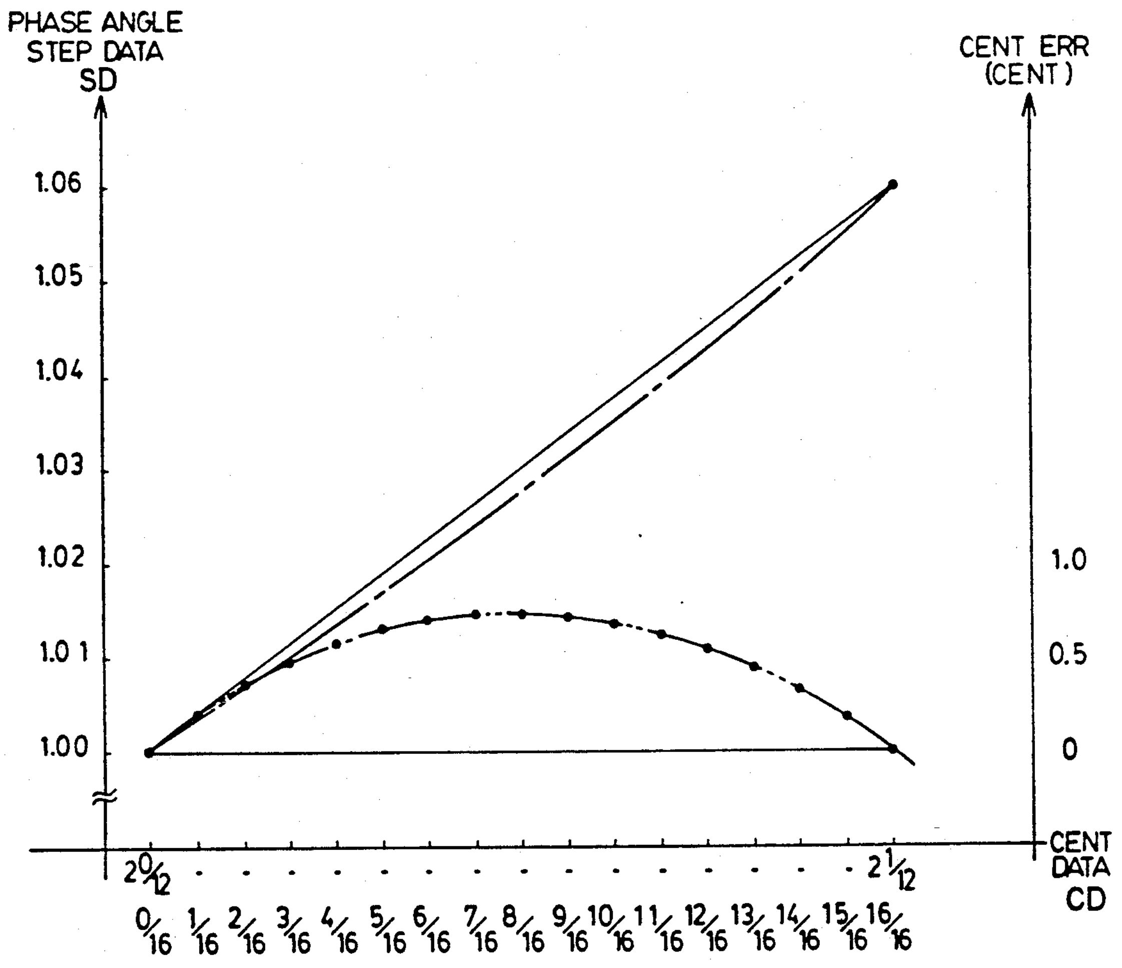
FIG. 8 is a graph showing the relationship between the values of the phase angle step data and those of the cent data.

Thus linear or proportional interpolation is performed by employing a linear characteristic indicated by a solid line in FIG. 8. Nevertheless, the value of each actual pitch is expressed as $2^{CD/1200}$ by using the cent data CD, and has an exponential characteristic indicated by a one-dot chain curve in this figure, and thus the difference between the interpolated phase angle step data NSDS and the actual pitches is as indicated by a two-dot chain curve in this figure. Therefore, by compensating the difference between the data NSDS and the actual pitches, by using this difference as compensation data, the interpolated phase angle step data is made to agree with the corresponding actual pitch.

Figure 4:
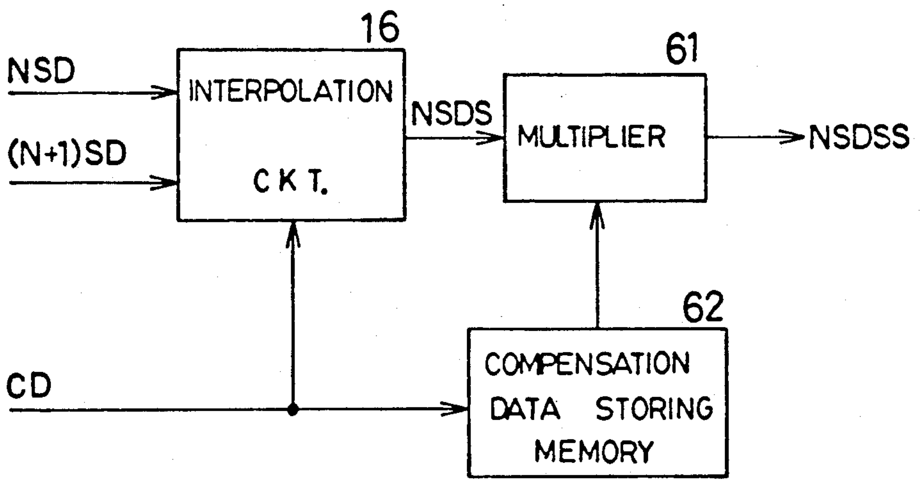
FIGS. 4 and 5 are circuit diagrams showing the construction of circuits for compensating the interpolated phase angle step data of the embodiment of FIG. 2.
Figure 9:
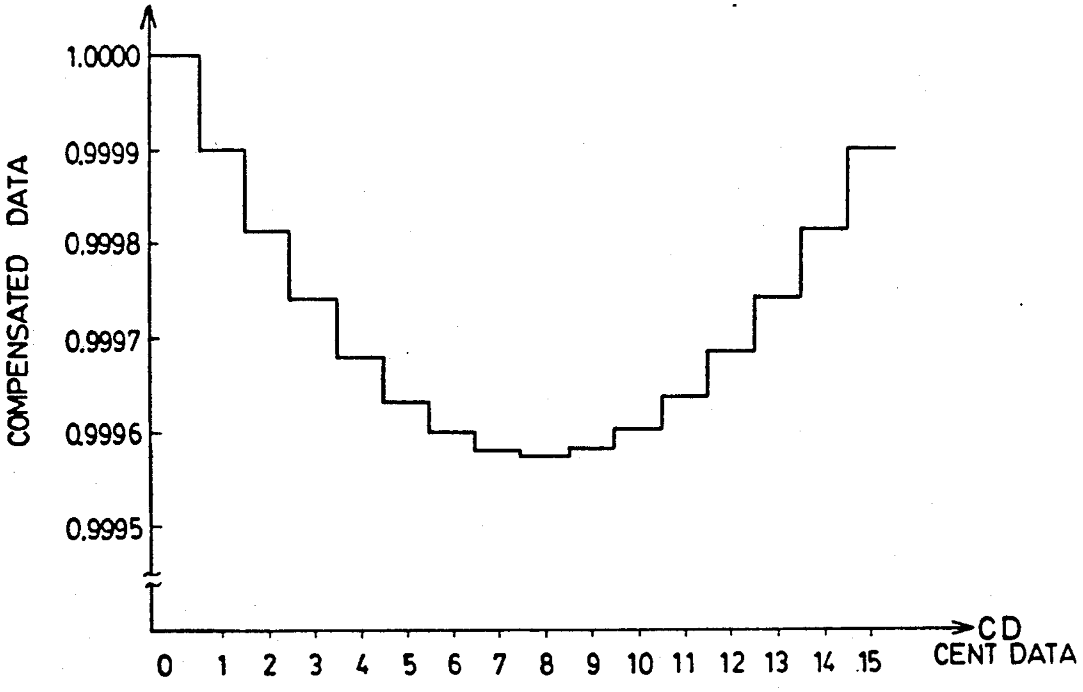
FIG. 9 is a graph showing the relationship between the values of compensation data and those of the cent data.

FIG. 4 shows the construction of an example of a circuit for effecting the interpolation. In this figure, the interpolation circuit 16 is exactly the same as that of FIG. 3A. Further, the compensation data is read from a compensation data storing memory 62 by using the cent data as reading address data, and is sent to a multiplier 61 wherein the compensation data are multiplied by the interpolated phase angle step data NSDS from the interpolation circuit. The compensation data is shown in FIG. 12 and as a graph in FIG. 9.

Therefore, according to the above process, the compensated and interpolated phase angle step data NSDSS properly corresponding to pitches are obtained.

Figure 5:
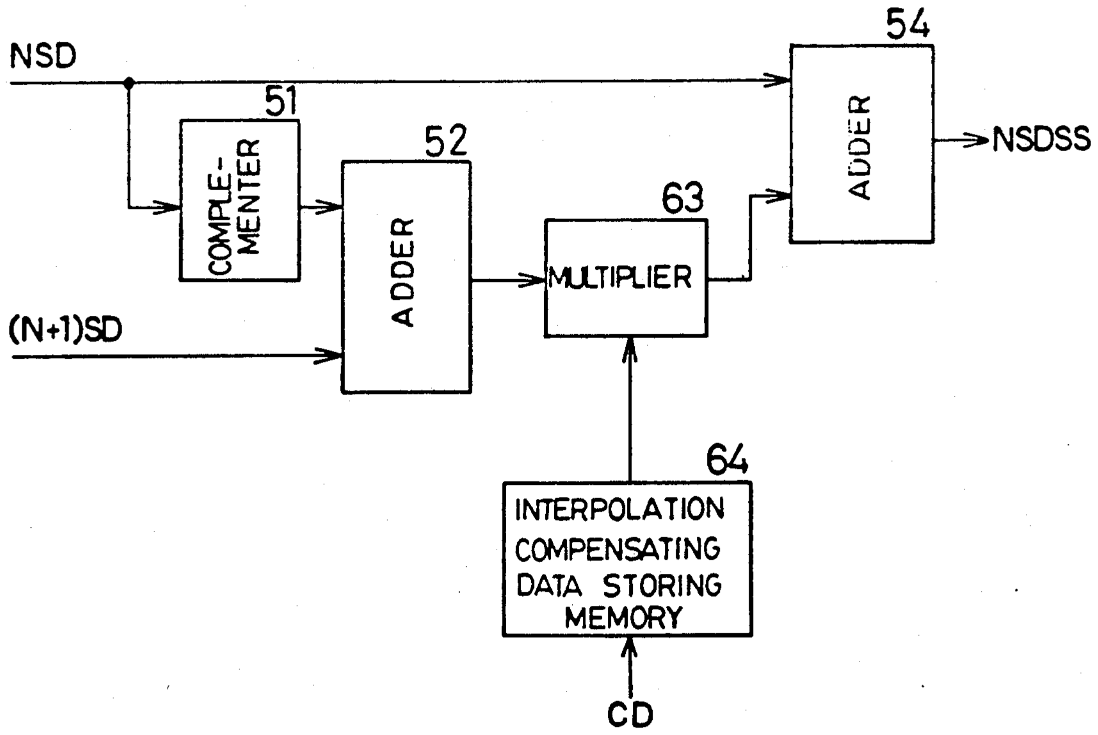
Figure 10:
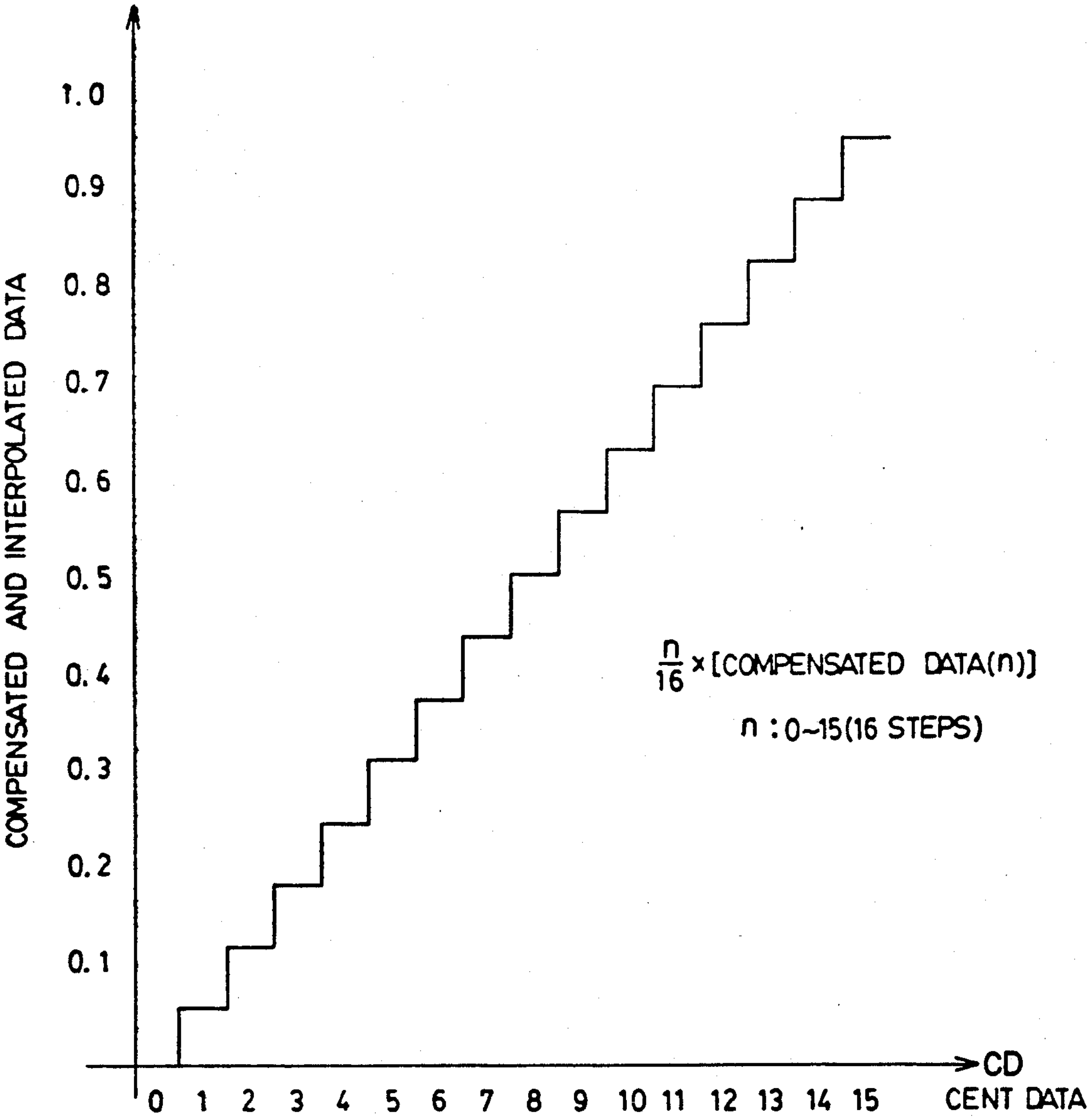
FIG. 10 is a graph showing the relationship between the values of compensated and interpolated data and those of the cent data.
Figure 13:
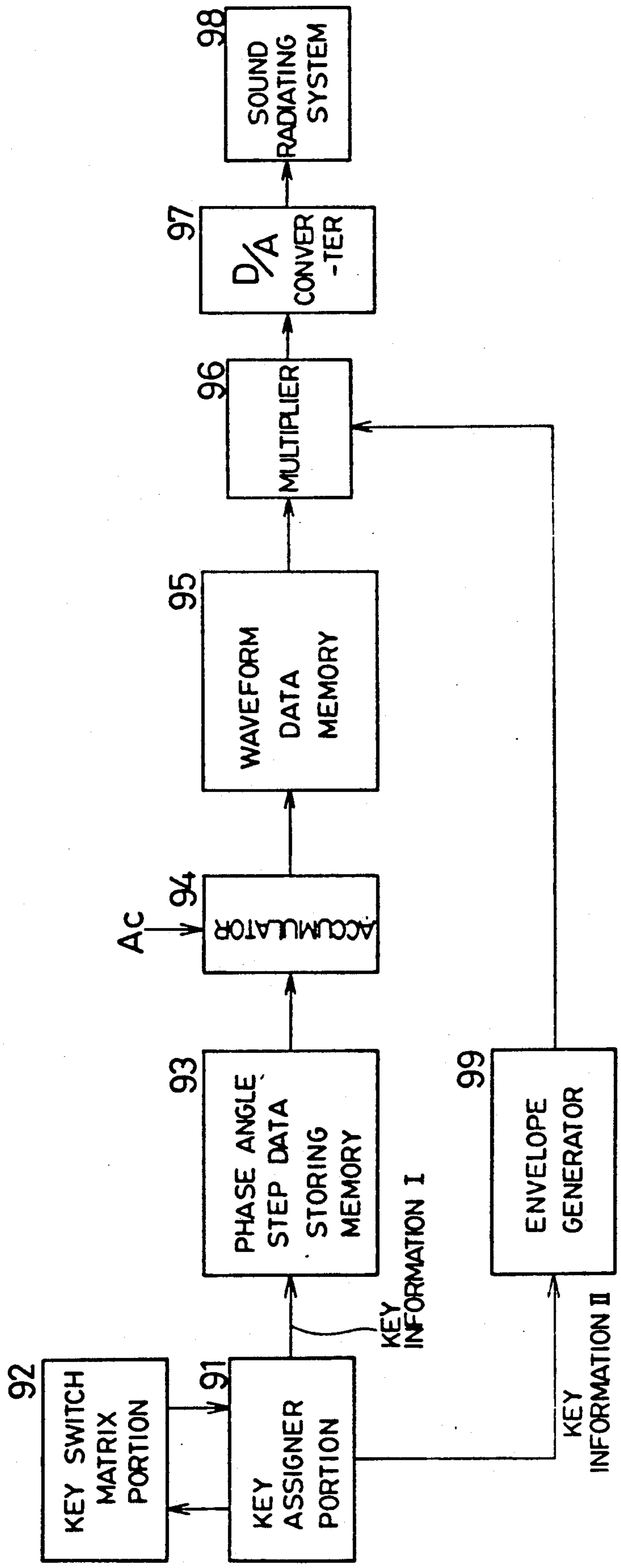
FIG. 13 PRIOR ART
FIGS. 13, 14 and 15 are circuit diagrams showing the construction of a conventional device.

FIG. 5 shows the construction of another example of a circuit for the interpolation. This circuit is constructed by adding an interpolation compensating data storing memory 64 to the circuit of FIG. 1A. Further, the compensation data from the interpolation compensating data storing memory 64 is multiplied to the difference data {(N+1)SD−NSD} sent from the adder 52, the thus obtained multiplication data is added to the phase angle step data NSD in the adder 54, and the compensated data is read out of the interpolation compensating storing memory 64 by using the cent data CD as reading address data. The values of the compensation data are as described in FIG. 12 and as shown by the graph of FIG. 10. The compensated and interpolated data of FIG. 12 is obtained by multiplying the compensation data of FIG. 12 by the cent values (CENT) of FIG. 12, and thus the digit position of the most significant bit of the result is properly set.

Figure 6:
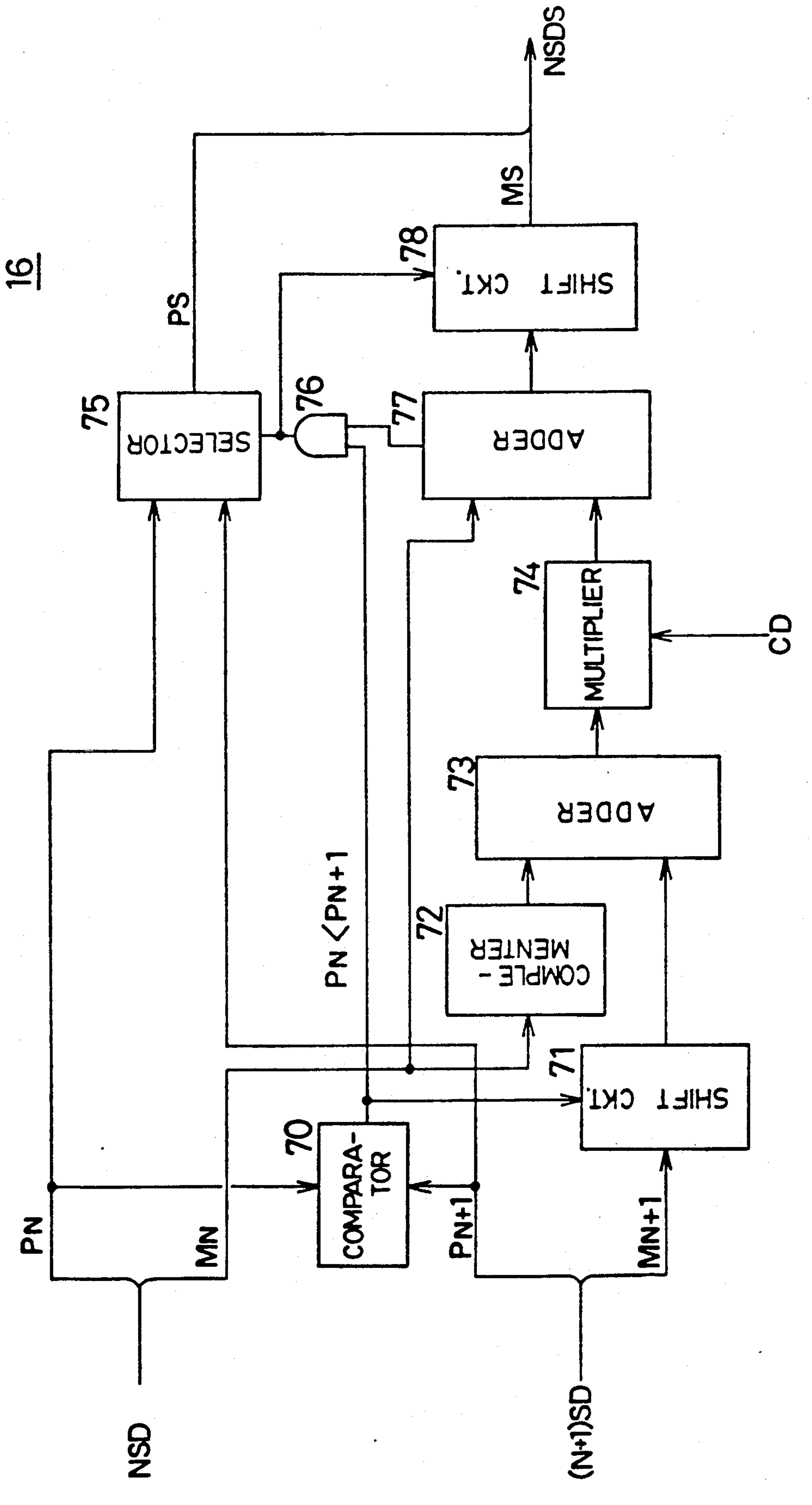
FIG. 6 is a circuit diagram of the interpolation circuit 16 where the phase angle step data SD is represented by using power data P and mantissa data M.

Alternatively, the compensated and interpolated phase angle step data NSDSS corresponding to proper pitches can be obtained as follows. FIG. 6 shows the interpolation circuit 16 when the phase angle step data SD comprises a characteristic having an exponent represented by power data P, and a mantissa represented by mantissa data M. The values of the phase step data in this case are shown in the two rightmost columns of FIG. 11. Further, a complementer 72, an adder 73, a multiplier 74, and an adder 77 are respectively the same as the complementer 51, the adder 52, the multiplier 53, and the adder 54 of FIG. 1A. Mantissa data $M_N$ of the phase angle step data NSD is inverted by the complementer 72 to a two's complement, which is further added by the adder 73 to mantissa data $M_{N+1}$ of the phase angle step data (N+1)SD sent through a shift circuit 71. Accordingly, the mantissa data $M_N$ of the phase angle step data NSD is subtracted from the mantissa data $M_{N+1}$ of the phase angle step data (N+1)SD, and as a result the difference $(M_{N+1}-M_N)$ therebetween them is obtained.

Subsequently, this difference data $(M_{N+1}-M_N)$ is multiplied by the cent data CD, by the multiplier 74, so that the value of the linear interpolation distance $(M_{N+1}-M_N)\times CD$ is obtained. This value $(M_{N+1}-M_N)\times CD$ is then added by the adder 77 to the mantissa $M_N$ of the phase angle step data NSD. Accordingly, the interpolation is performed with respect to the mantissa data $M_N$ and $M_{N+1}$, and as a consequence, mantissa data MS of the interpolated phase angle step data NSDS is obtained and is output through a shift circuit 78. Note, the data supplied to the multiplier 74 may be the interpolation compensating data sent from the interpolation compensating data storing memory 64 of FIG. 5, instead of the cent data CD.

Further, one of power data $P_N$ of the phase angle step data NSD and power data $P_{N+1}$ of the phase angle step data (N+1)SD is selected by a selector 75, and the selected power data $P_N$ and $P_{N+1}$ is output as power data PS of the interpolated phase angle step data NSDS.

Moreover, the power data $P_N$ and $P_{N+1}$ are compared by a comparator 70, and when the power data $P_{N+1}$ is larger than the power data $P_N$, a comparing signal is output therefrom to enable an AND gate 76 and is shifted to a shift circuit 71, whereupon the mantissa data $M_{N+1}$ of the phase angle step data (N+1)SD is shifted, for example, by one bit to the left, and is thus doubled to set the position of the most significant bit (MSB) of the mantissa data $M_{N+1}$ to a proper digit position, in comparison with the digit position of the MSB of the mantissa data $M_N$ of the phase angle step data NSD.

Furthermore, if a carry signal indicating the occurrence of a carry is generated when the mantissa data MS of the interpolated phase angle step data NSDS is obtained, the carry signal is supplied through the AND gate 76 to the selector 75, whereupon the power data $P_{N+1}$ of the phase angle step data (N+1)SD, which is larger than the power data $P_N$ of the phase angle step data NSD, is chosen. The carry signal is also supplied to a shift circuit 78, whereupon the mantissa data MS of the interpolated phase angle step data NSDS is shifted by one bit to the right, i.e. is reduced to a half thereof, and thus the modification of the mantissa data MS in response to the carry is performed.

As described above, even where the phase angle step data SD is represented by the form using the power data P and mantissa data M, the interpolation can be carried out.

Note, the part composed of the complementer 72, the adder 73, the multiplier 74, and the adder 77 may be replaced by the circuit of FIG. 1B composed of the multipliers 55 and 57, the complementer 56, and the adder 58.

Although a preferred embodiment of the present invention has been described above, it is understood that the present invention is not limited thereto and that other modifications will be apparent to those skilled in the art without departing from the spirit of the invention.

Figure 14:
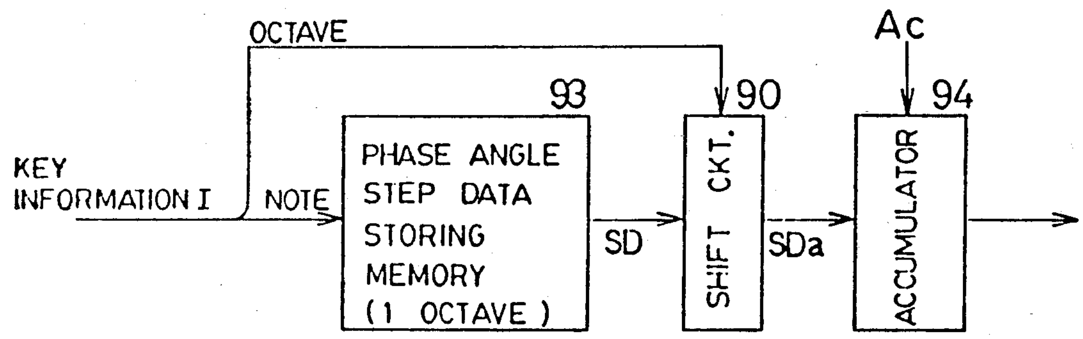
FIG. 14 PRIOR ART
Figure 15:
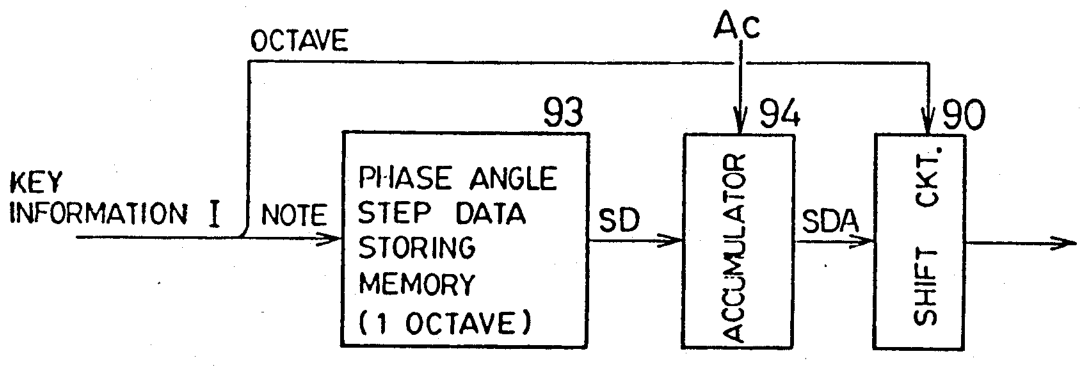
FIG. 15 PRIOR ART

For example, the shift circuit 90 shown in FIGS. 14 and 15 may be provided at the front stage (or the back stage) of the accumulator 4 of FIG. 3A, in such a manner that the interpolated phase angle step data NSDS or the compensated and interpolated phase angle step data NSDSS is shifted or modified. Therefore, the device need store only the phase angle step data SD of one octave in the phase angle step data storing memory 3. Further, the cent data CD may be data of more than 16 steps, and moreover, instead of the ratio of a proportionally converted value (i.e., the value of the phase angle step data or the interpolated phase angle step data) to the corresponding proper pitch, the difference between the proportionally converted value and the corresponding proper pitch may be used as the compensated data to be stored in the compensation data storing memory 62 of FIG. 4 and the interpolation compensating data to be stored in the interpolation compensating data storing memory 64. Further, data obtained by multiplying this difference by $\frac{1}{2}$, $\frac{1}{4}$, . . . , 2, or 4, . . . , in accordance with octave data, may be added to the compensated and interpolated phase angle step data NSDS. Moreover, as a means for effecting the interpolation, a processor executing a program for effecting the interpolation, an arithmetic logical circuit, a data decoder, and so on, may be employed. Furthermore, as the waveform data to be stored in the memory 5, waveform data for causing modulation effects such as a glide and a vibrato and waveform data representing a mixing ratio, which varies with time, for mixing a plurality of musical tone waveforms, other than the musical tone waveform data may be used.

The scope of the present invention, therefore, is to be determined solely by the appended claims.

We claim:

1. A device for changing and controlling the rate of generating waveform data, comprising:

waveform data generating means for generating the waveform data;

rate changing data storing and generating means for prestoring and generating rate changing data, the rate changing data being stored in steps wherein successive steps have a preset interval therebetween;

interpolation means for reading the prestored and generated rate changing data from said rate changing data storing and generating means and performing interpolation of the rate changing data of corresponding successive steps, wherein each pair of successive interpolated rate changing data steps has an interval therebetween smaller than a corresponding preset interval of the prestored and generated rate changing data; and rate changing means for changing the rate of generating the waveform data by said waveform generating means in accordance with the prestored and generated rate changing data from said rate changing data storing and generating means and the interpolated rate changing data from said interpolation means.

2. The device for changing and controlling the rate of generating waveform data as set forth in claim 1, wherein said waveform data generating means stores the waveform data and reads out the stored waveform data.

3. The device for changing and controlling the rate of generating waveform data as set forth in claim 1, wherein said rate changing data storing and generating means generates the rate changing data corresponding to the rates of generating the waveform data, wherein each pair of rates corresponding to successive steps are of a constant ratio with respect to each other, and wherein said interpolation means supplies the interpolated rate changing data interpolated between each pair of the rate changing data corresponding to successive steps prestored and generated by said rate changing data storing and generating means.

4. The device for changing and controlling the rate of generating waveform data as set forth in claim 1, wherein said rate changing data storing and generating means generates the rate changing data corresponding to the rates of generating the waveform data, wherein each pair of rates corresponding to successive steps are separated by a constant interval, and wherein said interpolation means supplies the interpolated rate changing data interpolated between each pair of the rate changing data corresponding to successive steps prestored and generated by said rate changing data storing and generating means.

5. The device for changing and controlling the rate of generating waveform data as set forth in claim 1, wherein said interpolation means performs a linear interpolation of the rate changing data of corresponding successive steps prestored and generated by said rate changing data storing and generating means.

6. The device for changing and controlling the rate of generating waveform data as set forth in claim 1, wherein said interpolation means performs an approximately linear interpolation of the rate changing data of corresponding successive steps prestored and generated by said rate changing data storing and generating means, and further, compensates for a difference between the interpolated rate changing and corresponding proper pitches.

7. The device for changing and controlling the rate of generating waveform data as set forth in claim 1, wherein the waveform data represents modulated musical tone waveforms.

8. The device for changing and controlling the rate of generating waveform data as set forth in claim 1, wherein the waveform data represents a waveform of a mixing ratio, varying with time, wherein a plurality of musical tone waveforms are mixed with each other in accordance with said mixing ratio.

9. A method of changing and controlling the rate of generating waveform data, comprising the steps of:

generating the waveform data in waveform data generating means;

generating rate changing data in successive steps which have a preset interval therebetween, in rate changing data generating means;

interpolating, in interpolation means, the rate changing data of corresponding successive steps, wherein each pair of successive interpolated rate changing data steps has an interval therebetween smaller than a corresponding preset interval of the generated rate changing data; and changing the rate of generating the waveform data by the waveform generating means, in accordance with the generated rate changing data from the rate changing data generating means and the interpolated rate changing data from the interpolation means, in rate changing means.

10. The method of changing and controlling the rate of generating waveform data as set forth in claim 9, said step of generating the waveform data comprising storing the waveform data and reading out the stored waveform data.

11. The method of changing and controlling the rate of generating waveform data as set forth in claim 9, said step of generating the rate changing data corresponding to the rates of generating the waveform data, wherein each pair of rates corresponding to successive steps are of a constant ratio with respect to each other, and said step of interpolating comprises supplying the interpolated rate changing data interpolated between each pair of the rate changing data corresponding to successive steps generated during said step of generating the rate changing data.

12. The method of changing and controlling the rate of generating waveform data as set forth in claim 9, said step of generating the rate changing data corresponding to the rates of generating the waveform data, wherein each pair of rates corresponding to successive steps are separated by a constant interval, and said step of interpolating comprises supplying the interpolated rate changing data interpolated between each pair of the rate changing data corrsponding to successive steps generating during said step of generating the rate changing data.

13. The method of changing and controlling the rate of generating waveform data as set forth in claim 9, said step of interpolating the rate changing data comprises a linear interpolation of the rate changing data between each pair of rate changing data of corresponding successive steps generated during said step of generating the rate changing data.

14. The method of changing and controlling the rate of generating waveform data as set forth in claim 9, said step of interpolating the rate changing data comprises an approximately linear interpolation of the rate changing data between each pair of rate changing data of corresponding successive steps generated during said step of generating the rate changing data, and compensating for a difference between the interpolated rate changing data and corresponding proper pitches.

15. The method of changing and controlling the rate of generating waveform data as set forth in claim 9, wherein the waveform data represents modulated musical tone waveforms.

16. The method of changing and controlling the rate of generating waveform data as set forth in claim 9, wherein the waveform data represents a waveform of a mixing ratio, varying with time, wherein a plurality of musical tone waveforms are mixed with each other in accordance with the mixing ratio.

* * * * *